US006871965B2

(12) United States Patent
Seifert et al.

(10) Patent No.: US 6,871,965 B2
(45) Date of Patent: Mar. 29, 2005

(54) BINOCULARS

(75) Inventors: Kuno Seifert, Mistelgau (DE); Carl Steiner, Bindlach (DE)

(73) Assignee: Steiner-Optik GmbH, Bayreuth (DE)

( * ) Notice: Subject to any disclaimer, the term of this patent is extended or adjusted under 35 U.S.C. 154(b) by 48 days.

(21) Appl. No.: 10/347,354

(22) Filed: Jan. 21, 2003

(65) Prior Publication Data

US 2003/0137726 A1 Jul. 24, 2003

(30) Foreign Application Priority Data

Jan. 18, 2002 (DE) .......................................... 102 01 721

(51) Int. Cl.[7] .............................................. G02B 23/18
(52) U.S. Cl. ...................................... 359/514; 359/407
(58) Field of Search .................................. 359/407, 431, 359/507, 513, 514, 831

(56) References Cited

U.S. PATENT DOCUMENTS 3,531,177 A    9/1970  Akin, Jr.
4,140,568 A  * 2/1979  Beecher ...................... 156/560
4,626,080 A   12/1986  Swarovski et al.

FOREIGN PATENT DOCUMENTS

DE           25 22 738        12/1976

* cited by examiner

*Primary Examiner*—Mark A. Robinson
(74) *Attorney, Agent, or Firm*—Browdy & Neimark, P.L.L.C.

(57) ABSTRACT

Binoculars having a prism assembly between the objective and ocular, wherein the prism assembly is secured on a prism holding device by means of a permanently elastic sealing compound.

8 Claims, 2 Drawing Sheets

BINOCULARS

BACKGROUND OF THE INVENTION

1. Field of the Invention

The present invention is directed to binoculars with a prism assembly between the objective and ocular.

2. Background Art

These prism assemblies have two main functions, i.e., on one hand they rotate the side-inverted and upside-down image that is supplied by the objective into the proper observation position, and on the other hand they shorten the overall physical length of an optical system of this type. To be able to fulfill these functions, the rotating system formed by the prisms is located between the objective and the common focal plane of the objective and ocular. In this context it is important that the rotating system remain permanently immovably fixed in its pre-adjusted position. Since prism assemblies have a relatively high inherent weight, their support must be designed very sturdy.

The attachment is conventionally implemented with adjusting screws, fastening bows and by means of hard, inelastic adhesives, if necessary. This results in point-specific high stresses and tensions and thus in an adverse effect on the optical transmission. With higher stresses, such as blows, jolts, or if the binoculars are dropped, the resulting point-specific stresses often also result in a breaking of the prism assembly.

SUMMARY OF THE INVENTION

With this as the starting point, the invention has as its object to create binoculars, or indicate a method for their production, whereby a fast, simple and very precise primary adjustment can be implemented during the production, which furthermore assures that the prism assembly is supported shock-proof when in use.

This object is met according to the invention in such a way that the prism assembly is fixed on a prism holding device by means of a permanently elastic sealing compound, preferably in the form of an acetic-acid-free compound on a silicone basis.

With this fastening technique, shock energy can be absorbed and, due to the elasticity and large working surface in the fastening range, occurring tensions that are triggered by temperature fluctuations, jolts, blows, and the like are very low.

This provides an improvement of the optical efficiency, a greater temperature fluctuation tolerance range of the binoculars, a significant increase in their robustness and, as a result, of course a reduced breakdown rate. At the same time, the manufacture and primary adjustment are simplified, as will be described in greater detail below.

Provision is advantageously made for the sealing compound to have a Shore hardness of approximately A 45, an elongation of approximately 250%, as well as a shear strength of 1.2 MPa.

The space that is delimited by the ocular and the area of the prism assembly facing the ocular is advantageously provided with at least one through opening. This through opening fulfills a dual function in that a vacuum can be applied via the through opening(s) during the production, so that the prism assembly is suctioned against the prism holding device, which specifically has the shape of a support collar. It is therefore possible to optically adjust the prism assembly during the manufacturing process in a very simple manner and to hold it positioned in the adjusted position in order to then perform a final securing by means of a permanently elastic sealing compound. After the sealing compound has hardened and the prism assembly has been secured, this same through opening can be used to fill the space with nitrogen in a manner known per se.

The invention also pertains to a method for producing binoculars, specifically according to any of claims 1 through 5, which are characterized in that the prism assembly is positioned on the prism holding device, that a negative pressure is applied via a through opening, and the prism assembly is pressed against a support surface of the prism holding device in this manner, that an optical adjustment is then performed, and the adjusted position of the prism assembly is secured.

Provision is made in particular for the securing of the prism assembly to take place with a quick-curing, specifically a UV-curable, sealing compound.

The permanently elastic sealing compound is entered specifically into a remaining free space between the prism holding device and prism assembly. This creates a large fastening surface that prevents peak loads.

The use of a sealing compound in the form of an acetic-acid-free compound on a silicone profile basis prevents the exhalation of acetic acid and thus any resulting stress on the optical system, and on the other hand, it produces the desired elastic support.

The invention will be explained in more detail below based on a preferred embodiment in conjunction with the drawing.

DESCRIPTION OF THE PREFERRED EMBODIMENT

Figure 1:
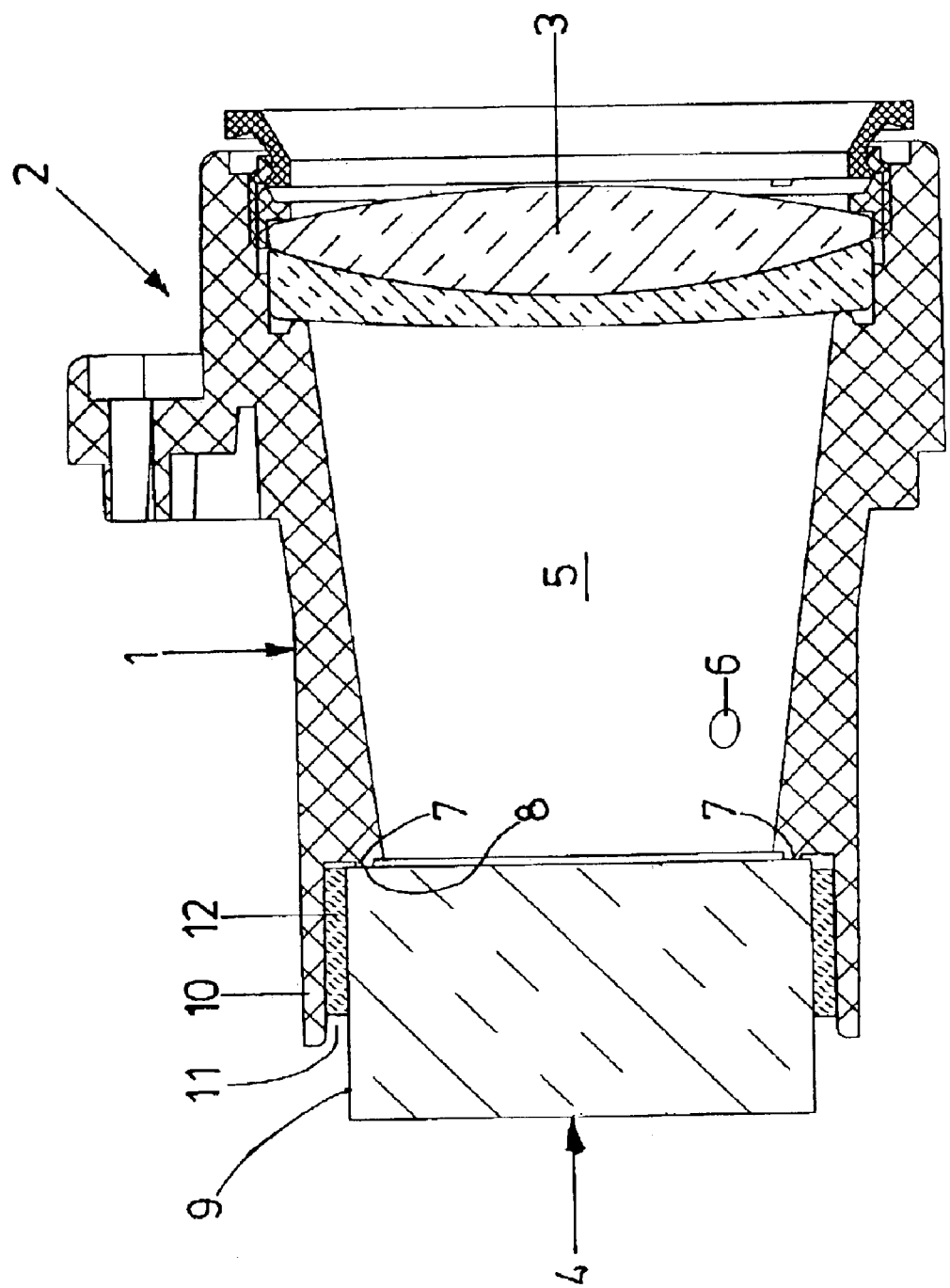
FIG. 1 shows a longitudinal section through the area between the objective and prism assembly of a pair of binoculars.
Figure 2:
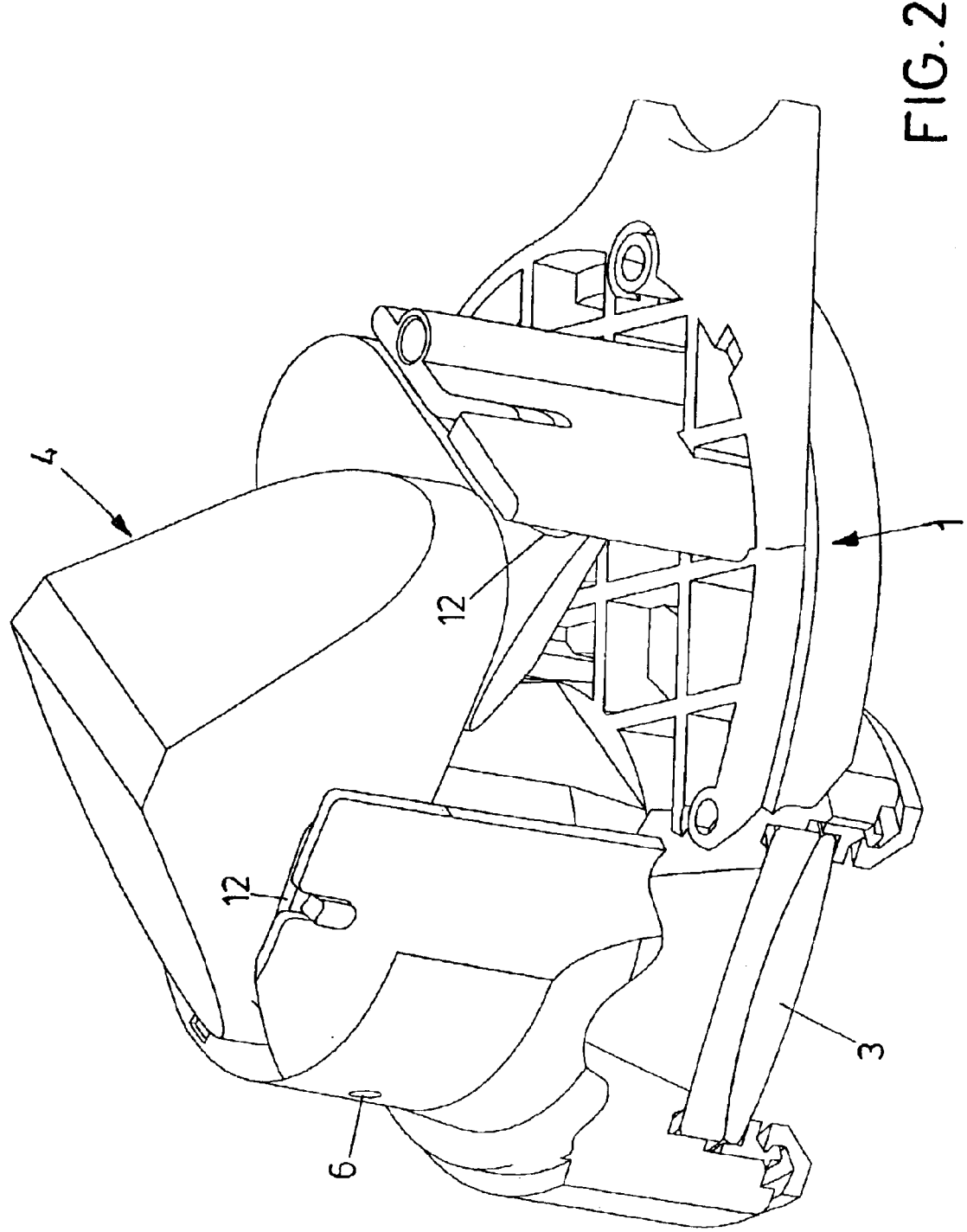
FIG. 2 shows a view in the perspective of the prism assembly of a pair of inventive binoculars.

FIG. 1 shows a longitudinal section through the area of the so-called prism seat 1 of a pair of binoculars 2, wherein an objective 3 is disposed on the front end of the prism seat 1, which is shown as the right end in the drawing, and a prism assembly 4 is disposed on the left end. Between the prism assembly 4, objective 3, and prism seat 1, an interior space 5 is formed, which is provided with a through opening 6. The prism assembly rests on the prism seat via a collar-shaped support surface 7 with a sealing lip 8. Between the outer face 9, the prism assembly, and an annular collar 10 of the prism seat, an annular free space 11 is formed that is filled with a permanently elastic sealing compound 12.

In the course of the production, the prism assembly 4 is placed upon the support surface 7 in a position that is rotated 90° to the right from FIG. 1, and a vacuum is applied via the through opening 6, so that the prism assembly 4 is pressed against the sealing lip 8. An optically correct positioning of the prism assembly 4 now takes place relative to the objective 3. As soon as this adjustment has been made (which eliminates the need to manipulate any adjustment screws), the permanently elastic sealing compound 11 is entered and hardened through UV radiation. Nitrogen is then introduced through the through opening 6 and the through opening 6 is sealed.

What is claimed is:

1. Binoculars (2) comprising: a prism seat (1); a prism holding device associated with said prism seat; an objective held in said prism seat; a prism assembly (4) held on said prism holding device between said objective and an ocular and at a location spaced from said objective; and a permanently elastic sealing compound (12) securing said prism assembly on said prism holding device, wherein said prism seat, said objective and said prism assembly delimit a closed space (5) provided with a through opening (6) for creating a vacuum in, and introducing a gas into, said closed space.

2. Binoculars (2) according to claim 1, wherein the sealing compound (12) is an acetic-acid-free compound on a silicone basis.

3. Binoculars (2) according to claim 2, wherein the shear strength of said sealing compound is approximately 1.2 MPa.

4. Binoculars (2) according to claim 1, wherein the sealing compound (12) has a Shore hardness of approximately A 45 and an elongation of approximately 250%.

5. A method for producing the binoculars (2) according to claim 1, said method comprising:

positioning the prism assembly (4) on the prism holding device;

applying a negative pressure via the through opening (6) in order to press the prism assembly (4) against a support surface of the prism holding device;

performing an optical adjustment;

securing the prism assembly in the adjusted position by introducing a quick-curing sealing compound (12) between the prism assembly and the holding device; and after the sealing compound (12) has hardened, introducing nitrogen through the through opening (6) into the space (5) that is delimited by the objective and the area of the prism assembly facing the objective.

6. Binoculars (2) according to claim 5, wherein the sealing compound is a UV-curable sealing compound (12).

7. Binoculars (2) according to claim 5, wherein the permanently elastic sealing compound (12) is entered into a remaining free space (11) between the prism holding device and prism assembly (4).

8. Binoculars according to claim 1, wherein said prism holding device comprises an annular collar surrounding said prism assembly such that an annular free space is provided between said collar and said prism assembly, and said sealing compound fills said annular space.

* * * * *